United States Patent

Pekau

[15] 3,643,017
[45] Feb. 15, 1972

[54] APPARATUS FOR CONSTRUCTING A REDUCED INFORMATION CONTENT HOLOGRAM

[72] Inventor: Dietlind Pekau, Munich, Germany
[73] Assignee: The Bendix Corporation
[22] Filed: Feb. 26, 1970
[21] Appl. No.: 14,354

[52] U.S. Cl. .............................. 178/6.5, 350/3.5, 178/DIG. 3
[51] Int. Cl. .......................................................... H04n 3/16
[58] Field of Search ..................................... 350/3.5; 178/6.5

[56] References Cited

UNITED STATES PATENTS 3,547,510  12/1970  De Bitetto .............................. 350/3.5
3,444,316   5/1969  Gerritsen ................................ 178/6.5

OTHER PUBLICATIONS

"Program of the 1968 Annual Meeting of the OS of A Invited Papers," Paper WC17 entitled, "Reduction of Bandwidth for High Resolution Hologram Trans.," October 9, 1968, "Acoustical Holograms Using Phase Information Only." L. Larmore-H. El-Sum, and A. F. Metherell, pp. 1533-1536, August 1969, Vol. 8, No. 8, "Applied Optics", "Expansion of Laser Beam in Only One Dimension", by A. Bess, pp. 2322-2325, November 1968, Vol. 7, No. 11, Applied Optics. "Holographic Storage of Electrical Signals", Moses Arm and Marvin King, July 1969, Vol. 8, No. 7, Applied Optics, pp. 1413-1419, Influence of Photographic Film on Wave Front Reconstruction II. "Cylindrical" Wave Fronts by P. F. van Ligten Amer. Opt. Co. Research Divs.

Primary Examiner—Robert L. Griffin
Assistant Examiner—Barry Leibowitz
Attorney—William F. Thornton and Plante, Hartz, Smith & Thompson

[57] ABSTRACT

Apparatus for forming a reduced information content hologram, for transmitting that hologram, and for the reconstruction of a scene or object from that hologram. The reduced information content hologram is formed employing a cylindrical lens or other means for focusing in one dimension. The hologram produced by the apparatus of this invention provides an image having parallax information along a preselected dimension but no parallax information along all lines running perpendicular to that preselected dimension.

5 Claims, 5 Drawing Figures

INVENTOR.
Dietlind Pekau
BY William A. Thornton
ATTORNEY.

APPARATUS FOR CONSTRUCTING A REDUCED INFORMATION CONTENT HOLOGRAM

BACKGROUND OF THE INVENTION

1. Field of the Invention

Apparatus for providing reduced information content holograms.

2. Description of the Prior Art

A hologram is an interference pattern which represents the amplitude and phase of a wave front carrying three-dimensional information of an object. A hologram is most commonly formed by reflecting a beam of laser light from an object; directing a reference beam of laser light capable of interfering with the reflected laser light so that it will intersect said reflected laser at a predetermined position; and placing a photographic film or other recording medium proximate the point of intersection of the interfering lasers to record the hologram. When the laser light is subsequently directed onto this recorded hologram, an observer will see a three-dimensional image of the object. Since holograms do provide three-dimensional images, it would be desirable to construct a television system for transmitting holograms instead of two-dimensional images. However, the information content of a hologram produced in the above described manner is extremely high and will require a very large bandwidth for transmission using conventional electronic apparatus.

The number of points on a conventional hologram which must be handled, or in other words the quantity of information which must be transmitted to send a complete hologram depends on the size of the hologram and the spacing between adjacent interference fringes. This quantity of information which must be handled to transmit the above described hologram is expressed by the following mathematical derivation:

First, the maximum spacing between adjacent fringes ($d$) on a hologram is expressed:

$$d = \frac{\lambda}{2 \sin\left(\frac{\theta_1 + \theta_2}{2}\right) \cos\left(\frac{\theta_1 - \theta_2}{2}\right)} \quad (1)$$

where:

$\lambda$ = wavelength of the laser light being used to form the hologram;

$\theta_1$ = maximum angle of incidence at which laser light scattered from the object strikes the recording medium;

$\theta_2$ = angle of incidence at which the reference laser light strikes the recording medium. For simplicity, the quantity $$\sin\left(\frac{\theta_1 + \theta_2}{2}\right) \cos\left(\frac{\theta_1 - \theta_2}{2}\right)$$

will be hereinafter represented by the symbol Y.

Second, conventional electronic reconstruction apparatus will have to be supplied with at least two points per fringe, in order to have sufficient information to reconstruct a hologram, or fringe pattern. The number of points ($N$) along a line across the surface of a hologram that must be transmitted in order to reconstruct the fringe pattern existing along that line is given by the equation:

$$N = \frac{b}{d/2} = \frac{4bY}{\lambda} \quad (2)$$

where:

$b$ = the length of the line being transmitted which is equal to the length of one side of the hologram, and the remaining symbols are as previously defined.

Since the information stored along $N$ lines will be needed to reconstruct a complete hologram, $N^2$ or pieces of information must be handled in order to completely transmit an ordinary hologram recorded on a rectangular medium of $b \times b$ size. To reconstruct a typical hologram, say one in which $\theta_1 = \theta_2 = 30°$, $b = 10$ centimeters, and $\lambda = 0.6$ micrometers, $10^{11}$ pieces of information would have to be transmitted. There is no known electronic apparatus which will transmit this quantity of information in a reasonable time interval and using a reasonable bandwidth. Various efforts have therefore been made to reduce the quantity of information stored on a hologram.

The spacing between adjacent fringes of a hologram depends upon the maximum separation angle between the reference beam and the light scattered from an object when the hologram is formed. When this maximum separation angle ($\theta_1 + \theta_2$) is large, spacing between adjacent fringes will be small and a large quantity of information will be contained in the hologram. Thus, a large quantity of information will have to be handled in order to transmit such a hologram. The quantity of information stored in a hologram, and therefore the quantity of information which must be handled in order to transmit that hologram, can be decreased simply by decreasing the maximum separation angle ($\theta_1 + \theta_2$) when forming the hologram. As this angle is made smaller, the spacing between adjacent fringes increases. Therefore, one method of decreasing the quantity of information contained in a hologram and therefore decreasing the quantity of information which must be transmitted is simply to decrease the maximum separation angle. This is easily accomplished by changing the angle at which the reference beam strikes the hologram. However, when the information to be transmitted is reduced by increasing the spacing between adjacent hologram fringes, the quality of the image that can be obtained from the transmitted hologram is also reduced. An image is obtained from a hologram by directing a reconstruction beam of coherent radiant energy onto the hologram. The hologram separates this beam into diffracted and undiffracted beams which should be separated by an angle at least as large as the maximum angle of incidence of the radiant energy scattered from the object during construction of the hologram. If the maximum separation angle ($\theta_1 + \theta_2$) is not kept large enough to create a fringe pattern that will keep the diffracted and undiffracted beams sufficiently separated, the image produced from the hologram will be superimposed on the reconstruction beam. This beam weakens the image by substantially reducing image contrast, and may even lower the signal to noise ratio below the level of intelligibility.

In another known method of reducing the quantity of information which must be handled in order to transmit a hologram, a conventional hologram is first formed. Electronic equipment then transmits the information stored along a narrow horizontal strip of the hologram. This narrow horizontal strip contains image information for the entire scene represented by the complete hologram from which the strip was taken, because each point on a hologram contains some information of each and every point of the scene represented by that hologram. This narrow strip can therefore be used to construct a complete image. The image produced using this narrow horizontal strip will not be as well resolved as an image produced using the complete hologram, and it will also not contain sufficient perspective or parallax information to produce a three-dimensional effect in a direction perpendicular to the narrow strip. However, this narrow strip contains all the perspective information in the horizontal direction, that is along the length of the strip, that was contained in the complete hologram. A human observer requires perspective information only along a line drawn between the pupils of the observer's eyes in order to see a three-dimensional effect. He will not need perspective information or a large angle of view along lines running perpendicular to the line connecting his eyes. this is because both of the observer's eyes will view a scene from the same vantage point along these perpendicular lines; they are separated only along the line connecting the pupils of the two eyes. An image formed from a conventionally constructed hologram will contain perspective information along all directions in the plane of the image and will therefore clearly provide a three-dimensional image for an observer. The image formed using only the information from a narrow, horizontal strip of a hologram will have the same perspective information as the image formed using the entire hologram in the horizontal direction, that is in the direction parallel to the line connecting the pupils of an observer's eyes when he views the hologram in a normal manner. The image formed using just the narrow strip of the hologram will therefore contain all the information necessary for an observer to see a three-dimensional image. This method effectively reduces the information which must be handled in order to transmit a hologram; a narrow strip of the hologram can be transmitted in less time and with a smaller bandwidth than is necessary to transmit the entire hologram. A major disadvantage of the above described method lies in the fact that complex and sophisticated electronic apparatus is necessary to produce a hologram that will provide an easily viewed image from the information contained along a single strip of a hologram. This apparatus must include means to receive the transmitted information to form a series of identical copies of the transmitted strip, and to assemble this series of strips in a side-by-side stacked relationship to form a hologram. If this is not done and an image is created directly from the narrow strip, a viewer will see the image as if viewed through a narrow slit, and will thus have to move his head in a direction perpendicular to the strip to see the entire image.

SUMMARY OF THE INVENTION

This invention comprises an extremely simple optical structure for creating a reduced information content hologram that provides an image having parallax information contained along a preselected dimension but having little or no parallax information along the dimension perpendicular to that preselected dimension. As used herein, the term "parallax information" will be used to designate the information necessary to provide an image having more than one perspective view, or in other words, a three-dimensional image. The preferred embodiments of this invention described herein include apparatus for irradiating an object with a beam of coherent radiation so that this radiation will be reflected or scattered from the object along a predetermined path. In the preferred embodiment, this coherent radiation is laser light. Light scattered from the object passes through a cylindrical lens which focuses or images that light in one dimension. That is, the cylindrical lens bends the light rays passing through it so that light rays scattered from a point on the object reach only a single point along one dimension of the focal plane of the lens even though they reach all points along the other dimension of that focal plane. The illustrated embodiments also include means for providing a reference laser beam capable of mixing or interfering with the laser light scattered from the object. The reference beam is directed to intersect the one-dimensionally focused, scattered light at the back focal plane of the cylindrical lens. A photographic film or other recording medium is placed proximate this point of intersection and records the interference pattern or hologram produced. Because the cylindrical lens focuses light in one dimension, an image produced with the above described hologram possesses a high parallax information content along the dimension in which the cylindrical lens provides no focusing, and contains little or no parallax information in which the cylindrical lens does focus light. That is, the hologram possesses only enough information to provide an image having a single perspective view along this other dimension.

The cylindrical lens and other elements used in constructing the reduced information content hologram are arranged so that when an image is produced using this hologram, and when an observer views that image in the normal manner, the dimension containing parallax information of the hologram will run parallel to a line connecting the pupils of the observer's eyes. As was discussed above, an observer needs parallax information only along lines running parallel to the line connecting his eyes to observe a three-dimensional effect. This hologram will therefore provide a complete three-dimensional image for an observer. But, the entire hologram formed by the apparatus of this invention can be transmitted using a narrower bandwidth than is required to transmit a conventional hologram, because this hologram contains less information than does a conventional hologram. That is, this hologram contains parallax information only along the horizontal dimension. Further, this reduced information content hologram can be reconstructed in a conventional straightforward manner. Although electronic apparatus such as multiplexing apparatus or apparatus for constructing a hologram from the information contained in only a portion of the original hologram can be used with the apparatus of this invention to further reduce the quantity of information which must be transmitted, the optical apparatus of this invention provides enough reduction in the information content of a hologram so that such apparatus need not be used.

The information contained, or fringe pattern produced, along the high parallax information content dimension of the recorded hologram of this invention will be identical to that contained along the corresponding dimension of a conventionally constructed hologram. Therefore, as was the case for the conventional hologram, $(4b \, Y/\lambda)$ pieces of information will have to be handled in order to transmit the information contained along any line running parallel to this dimension of the hologram. However, only $(a/r)$ pieces of information, where $a$ is the image size and $r$ is the resolution of the image to be formed, will have to be handled in order to transmit the information lying along any line running parallel to the other dimension of this hologram which includes little or no parallax information. The quantity $(a/r)$ represents the number of pieces of information that must be handled to transmit the information lying along any line of a simple, single perspective image such as a photograph. Thus, $(a/r)^2$ pieces of information must be handled to transmit an ordinary photograph, just as $(4b \, Y/\lambda)^2$ pieces of information must be handled to transmit a conventional hologram. Since the apparatus of this invention includes means for providing focusing along one dimension, but not along the other, it can be seen that only $(4b \, Y/\lambda)(a/r)$ pieces of information need be handled to completely transmit a hologram produced by the apparatus of this invention. Choosing the same values used for the prior art examples discussed above, namely $b=10$ cm., $\lambda=0.6$ micrometer, and $\theta_1=\theta_2=30°$, and choosing representative values for $a$ and $r$ of say $a=10$ cm., and $r=5$ lines per millimeter and substituting these values into the above expression produces:

$$N_1 = \left(\frac{4bY}{\lambda}\right)\left(\frac{a}{r}\right) = \left(\frac{4 \cdot 10 \cdot \sin 30°}{6 \cdot 10^{-5}}\right)\left(\frac{1.0}{.02}\right) = 1.6 \cdot 10^8 \qquad (3)$$

where:

$N_1 =$ the number of pieces of information which must be handled to transmit a hologram formed by the apparatus of this invention. This compares with $10^{11}$ pieces of information which must be handled to completely transmit a corresponding, conventionally constructed hologram.

Apparatus for constructing an image using the reduced information content hologram of this invention is also illustrated herein. This apparatus includes means for illuminating the reduced information content hologram with a beam of coherent radiation. An observer views the hologram through a cylindrical lens or other appropriate image forming device which focuses light in one dimension and sees a three-dimensional image at a predetermined distance from the hologram.

Alternate embodiments of both the apparatus of this invention for constructing a reduced information content hologram and of the apparatus for forming an image using the reduced information content hologram which include means for changing the radius of curvature of the laser beams used in constructing the hologram and image respectively are also shown herein. The inclusion of apparatus for changing the radius of curvature of one of the laser beams directed to strike the holographic surface, that is either the reference beam used in constructing a hologram or the beam directed to strike the hologram to produce an image, allows an operator to vary the distance between the reduced information content hologram produced by the apparatus of this invention and the image formed from that hologram.

And finally, the apparatus of this invention is shown included in a television transmitting system for sending and receiving threeydimensional images. The apparatus of this invention provides particular advantages in such an environment because it reduces the quantity of information which must be transmitted without significantly reducing the three-dimensional effect an observer sees.

BRIEF DESCRIPTION OF THE DRAWINGS

Further objects, features, and advantages of this invention, which is defined in the appended claims, will become more apparent from the following description of several preferred embodiments of this invention and the accompanying drawings in which:

DETAILED DESCRIPTION OF THE PREFERRED EMBODIMENTS

Figure 1:
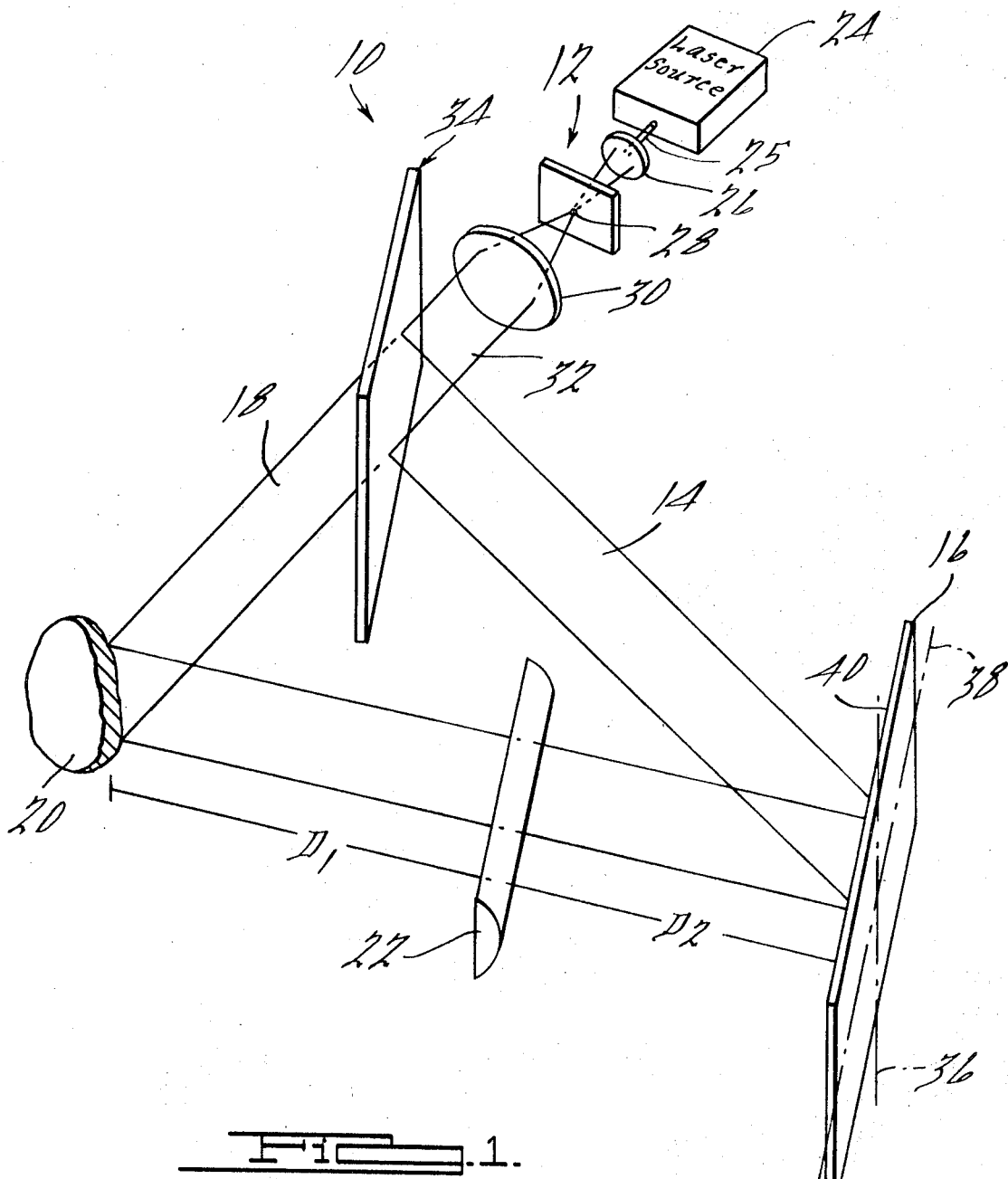
FIG. 1 is a three-dimensional schematic diagram illustrating apparatus for forming the reduced information content hologram of this invention.

FIG. 1 illustrates apparatus 10 for constructing a reduced information content hologram. The apparatus 10 includes means 12 for providing a reference beam 14 of laser light directed to strike a photographic film or other recording medium 16 and for also providing a second beam 18 of laser light directed to strike and be reflected from an object 20. A cylindrical lens 22 is placed to transmit light reflected from the object 20 toward the film 16. The film 16 is placed in the back focal plane of the lens 22. The apparatus 12 for providing the reference beam 14 and second beam 18, the object 20, the lens 22, and photographic film 16 are all positioned so that the reference beam 14 and the light scattered from the object 20 intersect proximate the film 16. This intersection creates an interference pattern, or hologram, which is recorded on the film 16. The distances to be maintained between the object 20 and the lens 22 ($d$) and between the lens 22 and the film 16 ($D_o$) in order to form an image in the proper plane and therefore in order to form a hologram on the film 16 are expressed by the equation:

$$(1/D_1) + (1/D_2) = (1/F_1)$$

where:
$F_1$ = focal length of the lens 22,
$D_1$ = distance between the object and the lens, and
$D_2$ = distance between the lens and the image plane.

The apparatus 12 provides a collimated beam of laser light having a large cross-sectional area so that the entire object 20 and film 16 will be properly illuminated. The apparatus 12 is conventional; any method or apparatus for producing beams of coherent radiation may be substituted for the particular structure illustrated. The apparatus 12 specifically includes a laser light source 24 which produces a laser beam 25, and an objective lens 26 for focusing the laser light produced by the source 24 at the pinhole aperture 28. A spherical lens 30 is placed to produce a collimated beam 32 of laser light having a large cross-sectional area from the energy radiated from the pinhole 28. Beam splitter 34 divides the beam 32 into a reference beam 14 and a second beam 18.

In operation, the reference beam 14 of laser light is directed to strike the photographic film 16 and the second beam of laser light is directed to strike the object 20 so that it will be reflected toward the film 16. The reflected laser light is scattered through a wide angle by the object 20 so that it will no longer be in the form of a collimated beam. The cylindrical lens 22 which is placed between the object 20 and film 16 acts to focus the scattered light in one dimension at the plane of the film 16. That is, the cylindrical lens bends light rays passing through it so that light rays from any selected point of the object 20 arrive at only a single point of the film 16 along the film dimension defined by the axis 36, but arrive at a locus of points along the film dimension defined by axis 38. This locus of points defines a line which runs parallel to axis 38. The reference beam 14 intersects the light scattered from the object 20 proximate the film 16 and mixes, or interferes with that scattered light so that an interference pattern or hologram 40 is formed on the film 16. Because of the focusing in one dimension provided by the cylindrical lens 22, the hologram 40 recorded on the film 16 will be a reduced information content hologram in that parallax information will be contained only along the dimension running parallel to the axis 38. The interference pattern or hologram 40 will contain only enough information along the dimension running parallel to the axis 36 to provide a single perspective image. As was described above, electronic apparatus will have to handle only ($4b$ $Y/\lambda$)($a/r$) pieces of information to completely transmit and reconstruct the hologram produced by the apparatus 10. Further, the transmission and reconstruction of this hologram can be accomplished in a straightforward manner.

Figure 2:
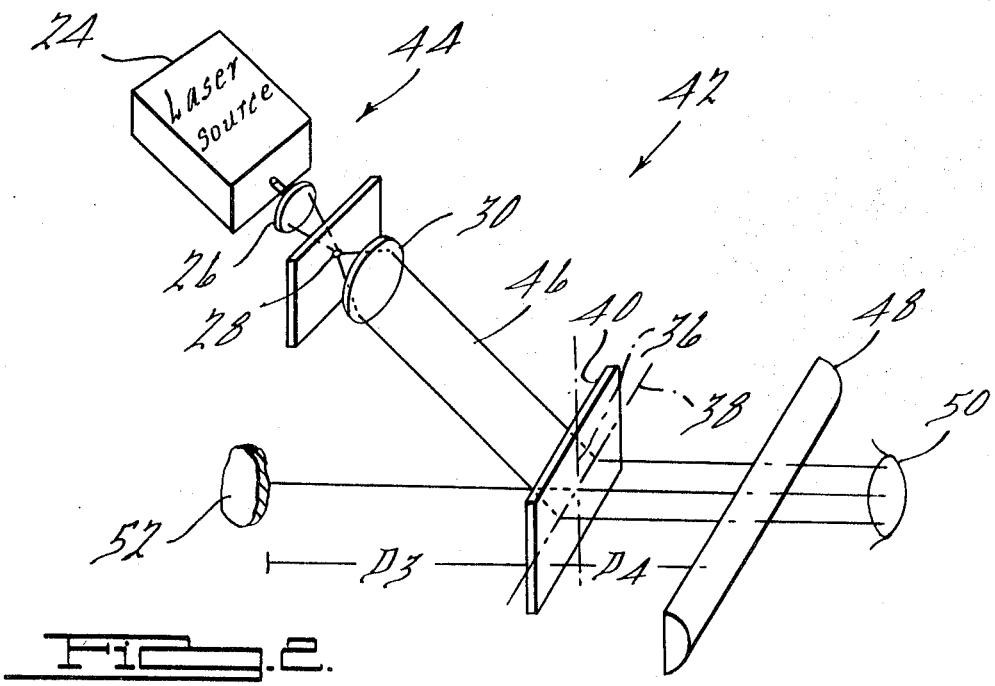
FIG. 2 is a three-dimensional schematic view of apparatus for forming an image of the object shown in FIG. 1 from the hologram produced by the apparatus illustrated in that figure.

FIG. 2 illustrates apparatus 42 for forming an image from the hologram 40. The apparatus 42 includes equipment 44 which produces a beam of collimated laser light 46 and projects that laser light onto the hologram 40. Beam 46 is referred to herein as a reconstruction beam because the original scene will be reconstructed, that is, an image of the original scene will be formed, when beam 46 strikes hologram 40. The equipment 44 for creating beam 46 is similar to the apparatus 12 illustrated in FIG. 1. The equipment 44 includes laser light source 24, objective lens 26, pinhole aperture 28, and collimating lens 30. Each of the devices 24, 26, 28 and 30 are included in the apparatus 12 shown in FIG. 1. The arrangement and operation of these devices are identical to that already described with respect to FIG. 1. Beam 46 is directed to strike the hologram 40 at the same angle that the beam 14 struck the film 16 in forming the hologram. This angle is selected for the illustrated preferred embodiments so that an undistorted image can be formed. The angle at which beam 46 strikes the hologram 40 can be varied somewhat when slight image distortion can be tolerated. The apparatus 42 also includes a cylindrical lens 48 placed directly behind the hologram 40. In operation, when the collimated laser beam 46 strikes the hologram 40, an observer 50 looking at the hologram 40 through the lens 48 will see a three-dimensional image 52 of object 20.

The focal power of the lens 48 and the spacing between the hologram 40 and the lens 48 must be chosen so that both transversal dimensions of the images 52 are seen with the same magnification. That is, image component formed from the information or light pattern stored along the dimension of axis 36 of the hologram 40 must be formed the same distance from the observer 50 and be of the same magnification as the image component formed from the information or light pattern stored along the dimension of axis 38 of hologram 40. As used herein, the term "image component" describes a light pattern which carries information of a scene, but does not carry enough information of that scene so that an observer can determine the nature of the scene by observing one image component alone. The information stored along the dimension defined by axis 36 of hologram 40 provides one image component while the information stored along the dimension defined by axis 38 provides a second image component. When both of these image components are focused at the same distance from an observer and are of the same magnification, he will see a readable and exact image of the object 20. When the reconstruction beam 46 strikes the hologram 40, the information stored along the dimension of axis 38 will form an image component at a particular distance ($D$) from the hologram 40. The lens 48 will have no effect on the distance from the hologram at which this first image component is formed or on its magnification. However, the lens 48 does act to focus the information stored along the dimension of axis 36 of the hologram 40. The lens therefore acts to determine he magnification and distance from the hologram at which this second image component is formed. In order to accomplish the desired results of having both image components of the same magnification and formed the same distance from the hologram 40, the distance ($D_a$) between hologram 40 and the image 52 is formed when that hologram is illuminated, and the distance ($D_4$) between the hologram 40 and the cylindrical lens 48 must be selected to satisfy the equation:

$$\frac{D_2}{D_1}\left(\frac{D_3+D_4}{D_4}\right)=\frac{D_3}{D_1+D_2} \quad (5)$$

where:

$D_3$ = distance between the hologram and the image formed when that hologram is illuminated, $D_4$ = distance between the hologram and the cylindrical lens, and all other quantities are as previously defined.

Equation 5 will be referred to herein as the magnification of the image seen by an observer. The magnification of the image increases as the quantity ($d_3/D_1+D_2$) increases.

In order to form a "readable image" for an observer, the distances $D_1$, $D_2$, $D_3$, and $D_4$ must be selected to satisfy the following two equations as well as the above magnification equation. The distance $D_3$ from the hologram 17 at which the image component formed from information stored along the dimension of axis 38 of the hologram 40 is determined by the holographic image equation:

$$-\frac{1}{D_1+D_2}+\frac{1}{R_1}+\frac{1}{D_3}+\frac{1}{R_2}=0 \quad (6)$$

where:

$R_1$ and $R_2$ are the radius of curvature of the reference and reconstruction beams respectively, both of which terms equal infinity for the case of parallel beams such as the beams 14 and 44, and all other symbols are as previously defined. Since both of the radii of curvature terms ($1/R_1$) and ($1/R_2$) appearing in the equation (6) can be set to zero, the above equation can be rewritten in the form:

$$D_3=D_1+D_2 \quad (7)$$

That is, the image component formed from information stored along the dimension of axis 38 of hologram 40 is formed the same distance from the hologram 40 that the object 20 was placed from the photographic film 16. In order to form the image component produced from information stored along the dimension of axis 36 of the hologram 40 at the same distance $D_3$ from the hologram as the image component formed from information stored along the axis 38 dimension, the cylindrical lens 48 having a focal power $F_2$ is placed a distance $D_4$ from the hologram 17 as determined by the lens equation:

$$\frac{1}{F_2}=\frac{1}{D_4}-\frac{1}{D_3+D_4} \quad (8)$$

where:

all symbols are as previously defined.

When all distances are selected to satisfy the above three equation, an observer 50 will see a complete three-dimensional image with parallax information along one axis of that image when beam 46 illuminates hologram 40. The image 50 will be formed at a distance $D_3$ from the hologram. Both of the components forming the image 50 will be of the same magnification so that the observer 50 will see an image which is of equal magnification along all lines in the plane of the image. The position of the observer 50 in viewing the image 52 may vary somewhat as long as the distance between lens 48 and the observer 50 is not greater than the focal length of the lens 48.

Figure 3:
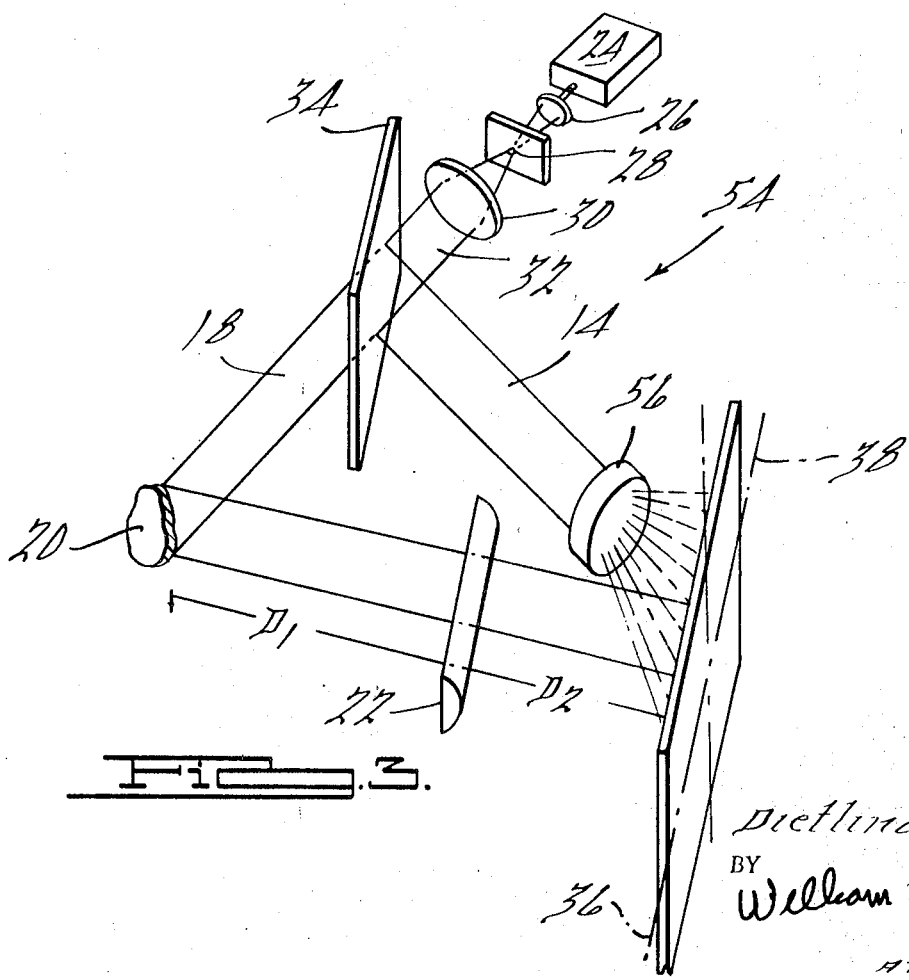
FIG. 3 is a three-dimensional, schematic view illustrating a modification of the apparatus shown in FIG. 1 which gives an operator freedom to vary the distance between the hologram produced using the apparatus of this invention and the image formed when that hologram is illuminated.

FIG. 3 illustrates alternate apparatus 54 for constructing a reduced information content hologram. The apparatus 54 is similar in construction and operation to the apparatus 10 illustrated in FIG. 1. Apparatus 54 differs from the apparatus 10 only in that it includes a lens 56 for changing the radius of curvature of the reference beam 14 from the value illustrated in the embodiment of FIG. 1. The lens 56 may be designed to cause either a convergence or divergence of the beam 14. The inclusion of the lens 56 in the apparatus 54 changes the radius of curvature of the reference beam 14 and thereby changes the relative distance which must be maintained between the various elements in the apparatus for constructing a hologram, and between the elements of the apparatus for forming an image from the hologram. As was stated above, in order to provide a "readable image," the various distances between the elements of the structure for forming a hologram and the structure for forming an image from that hologram must be selected to satisfy equations 5, 6, and 8. Since parallel, or collimated plane-wave reference and reconstruction beams which have a radius of curvature equal to infinity were used in the structures 10 and 40, the distance $D_3$ has to be selected to be equal to the distance $D_1+D_2$ (equation 7). When the reference beam 14 is not a plane-wave, collimated beam so that the reference beam radius of curvature term cannot be set to zero, as is the case for the apparatus 54, the holographic image equation is written:

$$\frac{1}{R_1}+\frac{1}{D_3}=\frac{1}{D_1+D_2} \quad (9)$$

with each of the symbols as previously defined. This equation clearly indicates that the distance $D_3$ can be increased or decreased with respect to the distances $D_1$ and $D_2$ simply by respectively decreasing or increasing the value of $R_1$.

The use of the lens 56 therefore allows a viewer to change the values of the quantities $D_1$, $D_2$, and $D_3$ with respect to each other as desired. The ability to change these values is a great convenience to a viewer. For example, in operating embodiments it will often be desirable to increase the distance $D_3$ with respect to the distances $D_1$ and $D_2$ so that the magnification of the image formed, that is the quantity ($D_3/D_1+D_2$), is increased from that which is obtained using apparatus with parallel or collimated reference and reconstruction beams. Or, at other times, it will be desirable to change these relative distances to decrease the quantity ($D_3/D_1+D_2$). When this is done, the magnification of the image formed will be decreased, but the parallax or three-dimensional information of that image will be increased.

The selection of particular lenses to obtain any desired radius of curvature, and therefore any desired relationship between $D_1$, $D_2$, and $D_3$, is well known. Therefore, no discussion of this subject will be provided herein other than to state the general rules: that as the power of the lens 56 increases, the absolute magnitude of the radius of curvature decreases; and that a diverging lens produces a positive value of radius of curvature whereas a converging lens provides a negative value radius of curvature.

Figure 4:
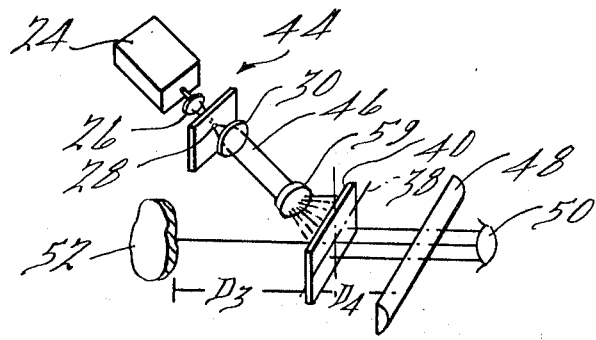
FIG. 4 is a three-dimensional, schematic view of a portion of the apparatus shown in FIG. 2, illustrating a modification of that apparatus that provides an operator the same freedom to vary relative distances as does the apparatus of FIG. 3.

FIG. 4 illustrates that the variations in image magnification and in the relative distances between optical elements that can be obtained by modifying the apparatus for constructing a hologram can also be obtained by modifying the apparatus for forming an image using that hologram. FIG. 4 illustrates image forming apparatus 58 which is identical to the apparatus 42 except for the inclusion of lens 59 in the reconstruction beam 46. As was the case with the apparatus 54 and lens 56, any desired relationship between the distances $D_1$, $D_2$, and $D_3$ can be obtained by proper selection of the lens 59. Selection of lens 59 allows an operator to vary the reconstruction beam radius of curvature term ($1/R_2$) so that the holographic image equation (6) will be satisfied for particular desired distances $D_1$, $D_2$, and $D_3$. As was the case for the apparatus of FIG. 3, the selection of the proper lens to obtain a particular radius of curvature is well known to those skilled in the art.

Figure 5:
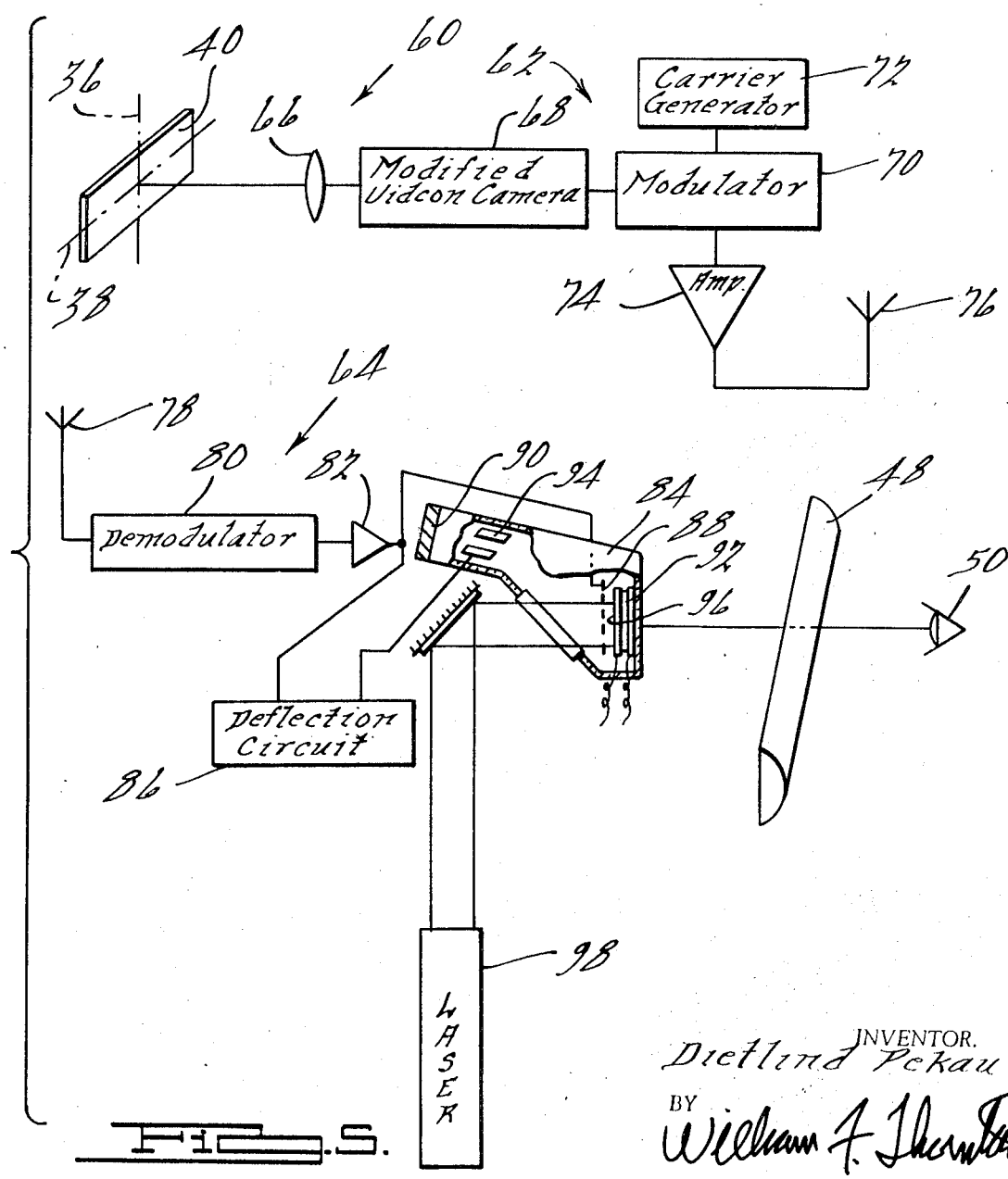
FIG. 5 is a schematic view of a television transmitting and receiving system which transmits the reduced information content hologram of this invention to provide complete three-dimensional images for an observer.

FIG. 5 illustrates a complete, real time television system 60 that includes both apparatus 62 which transmits the reduced information content hologram of this invention from its point of origin, and reception and reconstruction apparatus 64 which reconstructs the hologram and produces a three-dimensional image for a viewer. The transmitting apparatus 62 includes a lens 66 which focuses the recorded hologram 40 at the input area or photodetector of a modified vidicon camera 68. If a holographic interference pattern were formed by having two laser beams intersect at a vidicon camera input, the lens 66 will be unnecessary. It is anticipated that systems will generally be designed so that the lens 66 will be unnecessary. However, FIG. 5 has been drawn having a hologram 40 recorded on film 16 spaced a distance from the modified vidicon camera 68 and with a focusing lens 66 placed between the hologram and vidicon camera. This has been done both to facilitate explanation of the operation of this invention and to indicate the relationship between the apparatus illustrated in FIG. 1 and the apparatus illustrated in FIG. 4.

The modified vidicon camera 68 is very similar to the vidicon camera used in conventional television systems—the difference between camera 68 and a conventional camera being that camera 68 is constructed to scan at a slower rate and convert more pieces of optic information to electric signals along all scan lines parallel to axis 38 than would a camera transmitting an image instead of a hologram. Camera 68 is constructed to scan in this manner simply because more information is contained along these lines than would be along similar lines of an ordinary image. This is, image parallax information is stored along all lines running parallel to axis 38 of the hologram 40. The hologram 40 contains only enough information stored along the lines running parallel to axis 36, to provide a single perspective image. Therefore, camera 68 will scan at the same rate along lines parallel to axis 36 as would a camera transmitting only image information. Camera 68 converts the recorded optical signal pattern 40 to an electrical signal pattern. As used herein, the term "hologram" encompasses both the optical and electrical signal patterns since both signal patterns include the same image and parallax information. When camera 68 converts the optical signal pattern to an electrical pattern, it merely changes the form, and not the substance, of the signal pattern. Electric signals from the cameras 68 are transmitted to a modulator 70 where they are applied to a carrier wave produced by a carrier wave generator 72. The modulated carrier wave is amplified by an amplifier 74 and transmitted from a transmitting antenna 76.

The reconstruction apparatus 64 includes a receiving antenna 78 which receives the transmitted signals and sends these signals to a demodulator 80. The demodulator separates the carrier wave from the holographic information signal. The information signal is then amplified by an amplifier 82. This amplified information signal controls the operation of a modified cathode-ray tube 84. To accomplish this control, the information signal is transmitted to both a deflection circuit 86 and to a control grid 88 which is one element of the cathode-ray tube 84. The cathode-ray tube includes electron gun apparatus 90 for producing a beam of electrons which is scanned across an output surface 92 of the tube 84. The scan pattern traversed by this electron beam is determined by the operation of the tube deflection plates 94 which are similar to the deflection plates of a conventional cathode-ray tube. Operation of the deflection plates 94 is controlled by the deflection circuit 86 so that the electron beam is scanned across the output surface 92 in a pattern which corresponds to the input scan pattern of the modified vidicon camera 68. The output surface 92 comprises a thin layer of KDP crystalline material having a nonconductive or charge storage surface 96 formed thereon. The KDP crystal is a deuterated-potassium-dihydrogen-phosphate crystal ($KD_2PO_4$). The characteristics of this crystal are particularly described in an articles by G. Marie, in the French publication, "Phillips Research Reports," Vol. 22, pgs. 110–132 (1967). A KDP crystal is a birefringent material. When a voltage is applied along one axis of a KDP crystalline surface, the birefringence is modulated so that polarized light striking the crystal will be either phase modulated or optically rotated depending upon the direction of polarization of the incoming light. A charge pattern is placed across the output surface 92 by the beam of electrons striking the nonconductive coating 96 formed over the KDP crystalline surface. The nature of this charge pattern is determined by the potential of grid 88. That is, electrons striking the output surface will cause a potential to build on the portion of the surface struck which corresponds to the potential of the grid 88. A relatively negative potential will be established on a portion of the output surface when a relatively negative potential is maintained on the control grid 88, and a relatively positive potential will be established on a portion of the output surface when a relatively positive potential is maintained on the control grid 88. Since the potential of the grid 88 is controlled by the amplifier information signal as a beam of electrons from the gun section 90 is swept across the output surface 92, the voltage pattern maintained across the output surface corresponds to the intensity pattern of the recorded optical holographic pattern 40. A laser source 98 directs a laser beam onto the KDP crystalline surface that is properly polarized so that it will be phase modulated by that surface. The potential pattern across the surface 92 is such that this laser beam will be phase modulated to produce the same image pattern as that produced when the reconstruction beam 46 illustrated in FIG. 2 is projected onto the hologram 40. As was the case with the apparatus illustrated in FIG. 2, this image pattern will become a readable or meaningful image for the observer 50 when viewed through the cylindrical lens 48.

It is believed the above detailed description of the preferred embodiments of this invention will immediately suggest a great number of straightforward modifications to those skilled in the art. For instance, when forming a hologram, light need not be reflected from an object, but could be transmitted through a transparent or partially transparent three-dimensional object. The apparatus of this invention can be used with sources of coherent radiant energy other than laser light sources. Means other than a cylindrical lens for providing a one-dimensional image such as a cylindrical mirror can be used with this invention. The reconstruction apparatus 64 illustrated in FIG. 5 phase modulates a beam of laser light to produce an output image. Those skilled in the art could easily modify the illustrated apparatus to produce an output image by amplitude modulating the laser beam. It is known in the art that holograms can be used to reconstruct images by either phase modulating or amplitude modulating coherent light. It is also well known that when the polarization of the incident light striking the KDP crystalline surface is such that it will be optically rotated, the rotations can be transferred to amplitude modulations by using polarization apparatus. Both phase modulation and amplitude modulation systems for the real time reconstruction and display of holograms have been previously described in a copending application entitled "Real Time Holographic Image Display System and Optical Cross Correlator," Ser. No. 793,778, Rolf K. Mueller, inventor, which is assigned to the Bendix Corporation.

Since these and other modification of the described embodiments will be immediately obvious to those skilled in the art, what is claimed is:

1. A television system for providing images having parallax information along one axis comprising:
   means for forming a hologram on a surface to provide an image having parallax information along a preselected direction but having substantially no direction; information along all lines running perpendicular to said preselected direction:
   means for transmitting said hologram; including means for scanning along said hologram and providing electrical signals representing the characteristics of said hologram, said represented points being more closely spaced along lines running parallel to a preselected direction in the plane of said surface that along lines running perpendicular to said preselected direction in the plane of said surface.
   means for receiving said transmitted hologram; and display means for using said received hologram to provide an output image having parallax information along one axis.

2. The television system set forth in claim 1 in which said means for forming a hologram comprises:

means for irradiating an object with a first beam of coherent radiation, said irradiating means being arranged so that a modulated radiation signal carrying information of said object is directed along a predetermined path;

means for removing information available for the creation of a hologram from one dimension of said modulated radiation signal; and means for mixing a second beam of coherent radiation having substantially the same frequency as that of said first beam with said modulated first beam to create a hologram having reduced perspective information along one axis.

3. A television system for providing images having parallax information along one axis comprising:

means for forming a hologram to provide an image having parallax information along a preselected direction but having substantially no parallax information along all lines running perpendicular to said preselected direction;

means for transmitting said hologram;

means for receiving said transmitted hologram; and display means having means for providing a beam of coherent radiation, means for using said received hologram to modulate said beam, and first one-dimensional focusing means for receiving said modulated beam and providing an output image having parallax information along one direction but having no parallax information along lines perpendicular to said one direction.

4. The television system of claim 3 in which:

said beam providing means comprises means for providing a beam of visible laser light;

said modulating means includes a surface which modulates light striking said surface when a voltage is maintained across said surface, the degree of modulation being dependent upon the voltage maintained across said surface, means for reconstructing said hologram in the form of an electrical potential pattern across said surface, and means for directing said beam of visible laser light onto said modulating surface; and said first one-dimensional focusing means comprises cylindrically shaped focusing means disposed to receive said modulated laser beam from said modulating surface.

5. The television system of claim 3 in which said means for forming said hologram includes:

a recording surface;

means for irradicating an object with a first beam of coherent radiation, said irradicating means being arranged so that a modulated radiation signal carrying information of said object is directed to strike said surface;

second one-dimensional focusing means disposed between said object and said surface for focusing said modulated first beam along one dimension;

means for directing a second beam of radiation mutually coherent with said modulated first beam to intersect and interfere with said modulated first beam proximate said surface to form a hologram having reduced parallax information along one axis; and the position of said first one-dimensional focusing means is defined by:

the magnification equation $$\frac{D_2}{D_1}\left(\frac{D_3+D_4}{D_4}\right)=\frac{D_3}{D_1+D_2};$$

the holographic image equation $$\frac{1}{D_1+D_2}+\frac{1}{R_1}+\frac{1}{D_3}+\frac{1}{R_2}=0; \text{ and}$$

the lens equation $$\frac{1}{F_1}=\frac{1}{D_4}-\frac{1}{D_3+D_4}$$

$D_1 =$ the distance between said object and said said second one-dimensional focusing means;

$D_2 =$ the distance between said surface and said second one-dimensional focusing means;

$D_3 =$ the distance between said received hologram and said output image;

$D_4 =$ the distance between said received hologram and said first one dimension focusing means;

$F_1 =$ the focal power of said first one-dimensional focusing mean;

$R_1$ and $R_2 =$ the radius of curvature terms defining the nature of the coherent radiation used in the construction of said hologram and said image respectively.

* * * * *